United States Patent
Singh et al.

(10) Patent No.: US 11,566,589 B2
(45) Date of Patent: Jan. 31, 2023

(54) EXHAUST GAS RECIRCULATION COOLER BARRIER LAYER

(71) Applicant: International Engine Intellectual Property Company, LLC, Lisle, IL (US)

(72) Inventors: Navtej Singh, Arlington Heights, IL (US); Bradley Jay Adelman, Chicago, IL (US); Timothy M. Lyons, Batavia, IL (US); Paul Lawrence Berke, Chicago, IL (US); Darren William Gosbee, Maple Park, IL (US); John C. McCuisition, Del Mar, CA (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 17/579,534

(22) Filed: Jan. 19, 2022

(65) Prior Publication Data

US 2022/0228543 A1 Jul. 21, 2022

Related U.S. Application Data

(60) Provisional application No. 63/139,513, filed on Jan. 20, 2021.

(51) Int. Cl.
| | |
|---|---|
| *F02M 26/11* | (2016.01) |
| *F02M 26/50* | (2016.01) |
| *F02M 26/32* | (2016.01) |
| *F02M 26/35* | (2016.01) |

(52) U.S. Cl.
CPC ............ *F02M 26/11* (2016.02); *F02M 26/32* (2016.02); *F02M 26/35* (2016.02); *F02M 26/50* (2016.02)

(58) Field of Classification Search
CPC ........ F02M 26/11; F02M 26/32; F02M 26/35; F02M 26/50
See application file for complete search history.

(56) References Cited

U.S. PATENT DOCUMENTS

| | | |
|---|---|---|
| 6,401,700 B2 | 6/2002 | Balekai et al. |
| 6,513,507 B2 | 2/2003 | Balekai et al. |
| 6,959,700 B2 | 11/2005 | Wu et al. |
| 7,017,561 B1 | 3/2006 | Liu et al. |
| 7,089,890 B2 | 8/2006 | Obidi |

(Continued)

FOREIGN PATENT DOCUMENTS

JP 2001330394 A * 11/2001 ............. F02M 26/11

*Primary Examiner* — Kurt Philip Liethen
(74) *Attorney, Agent, or Firm* — Mark C. Bach; Umang Khanna

(57) ABSTRACT

Aspects of the disclosure relate to providing an EGR cooler including a barrier layer applied to EGR cooler components while allowing sufficient heat transfer between exhaust gases and the cooling medium. A barrier layer may be applied onto particular surfaces of the EGR cooler components to prevent deposition of hydrocarbons or soot on the EGR cooler components. In some arrangements, the barrier layer may comprise a refractory solid oxide. In other arrangements, an EGR cooler may comprise a catalytic barrier layer. The catalytic barrier layer may include a refractory solid oxide and a platinum group metal or mixed metal oxide to prevent accumulation of varnish material deposited onto EGR cooler components.

15 Claims, 3 Drawing Sheets

(56) References Cited

U.S. PATENT DOCUMENTS

| | | |
|---|---|---|
| 7,117,843 B2 | 10/2006 | Liu et al. |
| 7,131,271 B2 | 11/2006 | Bulicz et al. |
| 7,168,250 B2 | 1/2007 | Wei et al. |
| 7,171,957 B2 | 2/2007 | Liu et al. |
| 7,210,468 B1 | 5/2007 | Saele |
| 7,210,469 B1 | 5/2007 | Saele |
| 7,257,950 B2 | 8/2007 | Iwaszkiewicz |
| 7,281,529 B2 | 10/2007 | Lew et al. |
| 7,287,378 B2 | 10/2007 | Chen et al. |
| 7,299,771 B2 | 11/2007 | Wei et al. |
| 7,299,793 B1 | 11/2007 | Tyo et al. |
| 7,305,976 B1 | 12/2007 | Clarke |
| 7,311,090 B2 | 12/2007 | Lyons |
| 7,975,478 B2 | 7/2011 | Zielke et al. |
| 8,146,542 B2 | 4/2012 | Cattani et al. |
| 8,161,949 B2 | 4/2012 | Johnson |
| 8,267,069 B2 | 9/2012 | Hsia et al. |
| 8,375,713 B2 | 2/2013 | Ryan et al. |
| 8,393,314 B2 | 3/2013 | Melhem et al. |
| 8,596,252 B2 | 12/2013 | Liu et al. |
| 2001/0045209 A1 | 11/2001 | Balekai et al. |
| 2002/0023630 A1 | 2/2002 | Balekai et al. |
| 2003/0235733 A1* | 12/2003 | Haltiner, Jr. ......... H01M 8/1246 429/434 |
| 2004/0074480 A1 | 4/2004 | Chen et al. |
| 2005/0145380 A1* | 7/2005 | Usui ..................... F28F 1/00 165/177 |
| 2006/0005791 A1 | 1/2006 | Obidi |
| 2006/0075995 A1 | 4/2006 | Liu et al. |
| 2006/0174611 A1* | 8/2006 | Dilley .................... F02M 26/26 60/320 |
| 2006/0200297 A1 | 9/2006 | Liu et al. |
| 2007/0056721 A1* | 3/2007 | Usui ..................... F28D 7/1684 165/183 |
| 2007/0089716 A1 | 4/2007 | Saele |
| 2007/0089717 A1 | 4/2007 | Saele |
| 2007/0095503 A1* | 5/2007 | Sinha ................... F28D 1/05366 165/41 |
| 2007/0157893 A1 | 7/2007 | Wei et al. |
| 2007/0175457 A1 | 8/2007 | Lyons |
| 2007/0266999 A1 | 11/2007 | Clarke |
| 2008/0115747 A1 | 5/2008 | Snyder et al. |
| 2009/0139500 A1 | 6/2009 | Gronberg |
| 2010/0083930 A1 | 4/2010 | Clarke et al. |
| 2011/0023796 A1 | 2/2011 | Cattani et al. |
| 2011/0023840 A1 | 2/2011 | Cattani et al. |
| 2011/0036087 A1 | 2/2011 | Miller |
| 2011/0041816 A1 | 2/2011 | Hsia et al. |
| 2011/0042053 A1* | 2/2011 | Ekstrom .............. B23K 35/286 72/200 |
| 2011/0048389 A1 | 3/2011 | Hsia et al. |
| 2011/0079002 A1 | 4/2011 | Siuchta |
| 2011/0083648 A1 | 4/2011 | Cattani et al. |
| 2011/0088671 A1 | 4/2011 | Johnson |
| 2011/0100342 A1 | 5/2011 | Morais et al. |
| 2011/0100343 A1 | 5/2011 | Liu et al. |
| 2011/0108013 A1 | 5/2011 | Melhem et al. |
| 2011/0131979 A1 | 6/2011 | Ryan et al. |
| 2011/0271661 A1* | 11/2011 | Knafl ..................... F02M 26/11 60/287 |
| 2013/0277022 A1* | 10/2013 | Neal ......................... F28F 9/00 165/163 |
| 2014/0096943 A1* | 4/2014 | De Pelsemaeker ... F28F 21/089 165/134.1 |
| 2015/0075505 A1 | 3/2015 | Ryan et al. |
| 2015/0176538 A1 | 6/2015 | Baasch et al. |
| 2016/0108862 A1 | 4/2016 | Siuchta et al. |
| 2017/0284343 A1* | 10/2017 | Nitta ....................... F28D 1/06 |

\* cited by examiner

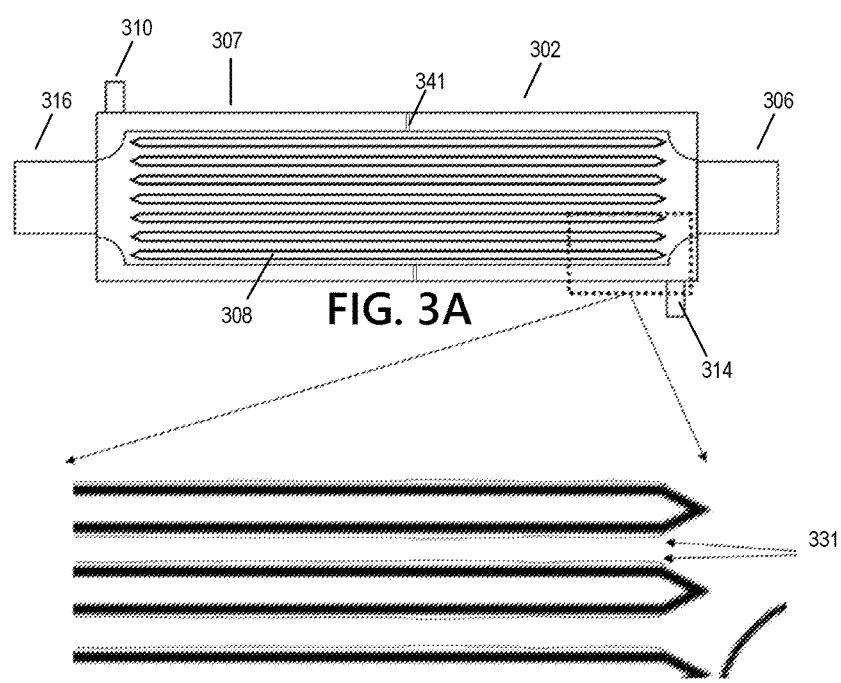
FIG. 3A
FIG. 3B
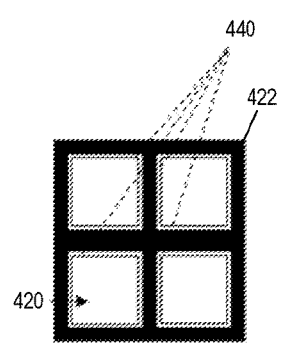
FIG. 4

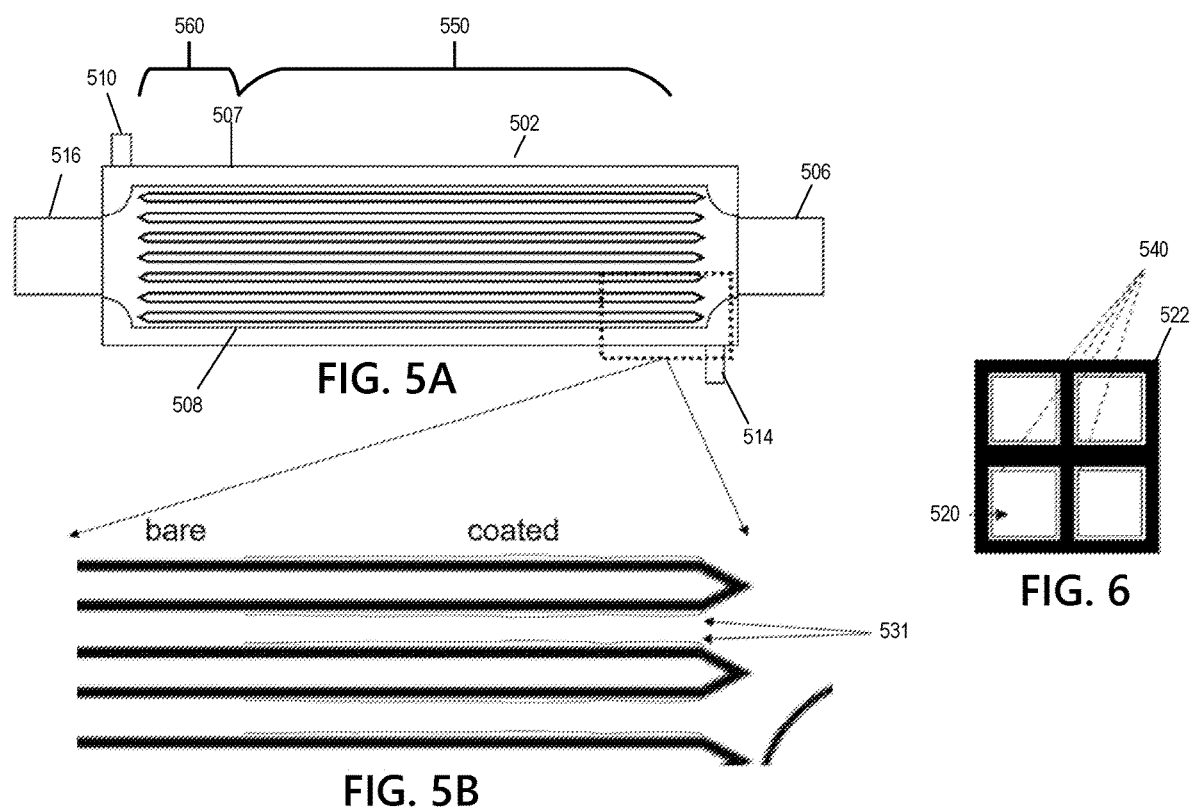

EXHAUST GAS RECIRCULATION COOLER BARRIER LAYER

CROSS-REFERENCE TO RELATED APPLICATIONS

This application claims the benefit of priority to U.S. Provisional Application Ser. No. 63/139,513, filed Jan. 20, 2021, the entire disclosure of which is hereby incorporated by reference in its entirety.

FIELD OF THE INVENTION

The field of the disclosure relates to internal combustion engines including compression ignition (e.g., diesel) engines. More specifically, the disclosure relates to improvements in exhaust gas recirculation (EGR) coolers for controlling nitrogen oxides (NOx) emissions without additional engine packing space.

BACKGROUND

Aspects of the disclosure relate to internal combustion engines and EGR coolers for NOx emission control. EGR coolers are used to lower NOx levels produced in internal combustion engine cylinders. EGR coolers may be used to lower the resulting temperature at the intake manifold to improve capacity to lower NOx emissions and minimize particulates. Exhaust gases are removed from the exhaust manifold and directed to the intake manifold. If the hot exhaust gases are added to the intake gases, the resulting higher intake manifold temperatures results in higher NOx formation. Therefore, an EGR cooler is used to lower the resulting intake temperatures of the mixed gases. As a result, engine combustion modes are created that have lower NOx and soot formation than would be possible if EGR is not used or if EGR gases are not cooled.

One issue that is not addressed with standard EGR cooler design is that exhaust gases also contain hydrocarbons and soot. Hydrocarbons and soot may combine to form a varnish that deposits onto components within the EGR cooler. The formed varnish acts as a barrier layer between the hot exhaust gases and the cooling media.

The adhesion of varnish to components within the EGR cooler leads to a variety of issues including reduced cooler effectiveness, restriction of airflow, fouling of sensors, and corrosion of components due to acidity of the soot. For the foregoing reasons, there is a need for an improved EGR cooler that effectively lowers NOx emissions.

SUMMARY

In light of the foregoing background, the following presents a simplified summary of the present disclosure in order to provide a basic understanding of various aspects of the disclosure. The summary is not limiting with respect to the exemplary aspects of the disclosure described herein and is not an extensive overview of the disclosure. It is not intended to identify key or critical elements of or steps in the disclosure or to delineate the scope of the disclosure. Instead, as would be understood by a person of ordinary skill in the art, the following summary merely presents some concepts of the disclosure in simplified form as a prelude to the more detailed description provided below. Moreover, sufficient written descriptions of the embodiments of this application are disclosed in the specification throughout this application along with exemplary, non-exhaustive, and non-limiting manners and processes of making and using the inventions, in such full, clear, and concise, and exact terms in order to enable skilled artisans to make and use the inventions without undue experimentation and sets forth the best mode contemplated by the inventor for carrying out the inventions.

Aspects of this disclosure address one or more shortcomings in the industry by providing an EGR cooler including a barrier layer applied to EGR cooler components while allowing sufficient heat transfer between exhaust gases and the cooling medium. In some embodiments, the barrier layer may be applied onto particular surfaces of the EGR cooler components to prevent deposition of hydrocarbons or soot on the EGR cooler components. In some arrangements, the barrier layer may comprise a refractory solid oxide.

In another aspect of the disclosure, an EGR cooler may comprise a catalytic barrier layer. The catalytic barrier layer may include a refractory solid oxide and a platinum group metal or mixed metal oxide to prevent accumulation of varnish material deposited onto EGR cooler components.

In some arrangements, EGR cooler may be zoned coated with a catalytic barrier. In an embodiment, zoned coated components may be contiguous with the inlet of EGR cooler at which point the exhaust gases may be at higher temperature and aid in burning off hydrocarbons and soot preventing varnish formation.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3A illustrates a plan view of an EGR cooler having a barrier layer in accordance with an with one or more aspects described herein;

FIG. 3B illustrates an expanded view of a portion of FIG. 3A in accordance with one or more aspects described herein;

FIG. 4 illustrates a portion of the cross sectional view of the EGR cooler in FIG. 3A according to one or more aspects described herein; and FIG. 5A illustrate zone coating in an EGR cooler in accordance with one or more aspects described herein;

FIG. 5B illustrates and expanded view of a portion of FIG. 5A in accordance with one or more aspects described herein; and FIG. 6 illustrates a portion of a cross sectional view of the EGR cooler in FIG. 5A according to one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Aspects of this disclosure address one or more shortcomings by providing an EGR cooler with a barrier layer applied to EGR cooler components allowing sufficient heat transfer between exhaust gases and the cooling medium. The disclosed EGR cooler reduces overall package size of the emissions equipment as a smaller footprint EGR cooler may be utilized due to improved effectiveness of the EGR cooler over its lifetime. The smaller footprint of utilized emissions equipment including the EGR cooler saves valuable engine packing space while reducing component costs.

Figure 1:
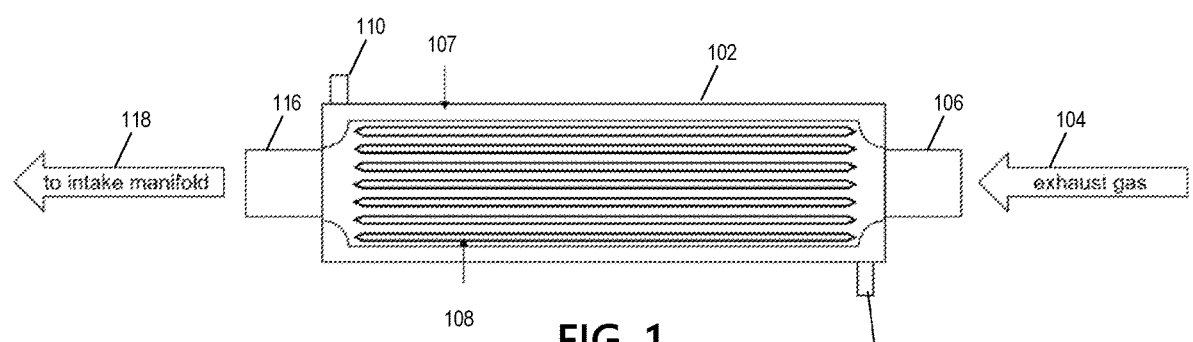
FIG. 1 illustrates a plan view of an EGR cooler in accordance with one or more aspects described herein.

FIG. 1 depicts an illustrative plan view of an EGR cooler in accordance with an aspect of the disclosure. In FIG. 1, an EGR cooler 102 receives exhaust gas 104 at inlet 106 of EGR cooler 102. The exhaust gas 104 flows through a plurality of EGR channels 108 fixedly arranged in EGR cooler housing 107. In an embodiment, the EGR channels 108 may include different geometric configurations of channels such as straight, dimple, ribbon, spring, and spiral.

In an embodiment, EGR cooler 102 may include straight rectangular shaped EGR channels 108. As those skilled in the art will realize, EGR cooler 102 may use different channel geometric configurations based on various design criteria such as pressure drop, heat transfer rates, and production costs. In an embodiment of the disclosure, EGR cooler 102 may also include using different channels types in a single EGR cooler.

In an aspect of the disclosure, exhaust gas 104 is cooled by a coolant medium that circulates between channels and absorbs heat from exhaust gas 104. The coolant medium enters EGR cooler 102 at coolant inlet 110 and circulates between the EGR channels 108 of EGR cooler 102 before being discharged at coolant outlet 114. In an embodiment, the coolant medium flows around the EGR channels 108 to provide a large surface area for effective heat transfer. The exhaust gas 104 after flowing through EGR channels 108 exits the EGR cooler 102 at outlet 116 and proceeds to intake manifold 118.

Figure 2:
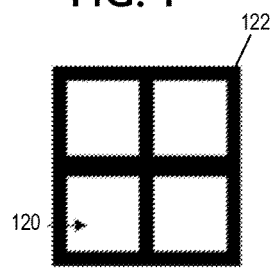
FIG. 2 illustrates a portion of a cross sectional view of the EGR cooler in FIG. 1 in accordance with one or more aspects described herein.

FIG. 2 illustrates a cross sectional view of EGR channels 108. As shown in FIG. 2, exhaust gas may flow within rectangular channels 120 as the coolant medium circulates between the channels 122.

FIG. 3A depicts an illustrative plan view of an EGR cooler 302 having a barrier layer in accordance with an aspect of the disclosure. In an embodiment, the barrier layer between EGR cooler components allows sufficient heat transfer between exhaust gases and the cooling medium. The barrier component may allow hydrocarbons and soot to adhere to the barrier layer but still allow exhaust gasses to diffuse through the barrier layer and contact the EGR cooler components for efficient heat transfer.

In an embodiment, the barrier layer may be a highly porous material that is deposited on top of the internal surfaces of EGR cooler 302. The highly porous material may allow hot exhaust gases to penetrate to the surface for heat transfer but prevent soot and hydrocarbons from touching the cold surfaces of the EGR cooler and forming a varnish that lowers heat transfer efficiency. In yet another embodiment, the barrier layer may be a refactor solid such a high surface alumina that is applied to surfaces of EGR cooler 302 that have contact with recirculated exhaust gas.

In another embodiment, the barrier layer may be a catalytic barrier layer. The catalytic barrier layer may include a PGM (platinum group metal) component or components added to the high surface alumina. This added catalytic component may burn any hydrocarbon present in the exhaust gas and prevent formation of a varnish on the internal surfaces of EGR cooler 302.

In an aspect of the disclosure, the catalytic barrier layer may include a mixed metal oxide known for hydrocarbon oxidation activity such as those having polyvalent transition metals such as Mo (molybdenum), Co (cobalt) and/or Mn (manganese). The mixed metal oxide may include perovskites of the general formula of $ABO_3$ and contain La, Co, Ba, Sr, Mn, and Y among other suitable elements.

As shown in FIG. 3A, an EGR cooler 302 receives exhaust gas at inlet 306 of EGR cooler 302. The exhaust gas flows through a plurality of EGR channels 308 fixedly arranged in EGR cooler housing 307. In an embodiment, the EGR channels 308 may include different geometric configurations of channels such as straight, dimple, ribbon, spring, and spiral.

In an embodiment, EGR cooler 302 may include straight rectangular shaped EGR channels 308. As those skilled in the art will realize, EGR cooler 302 may use different channel geometric configurations based on various design criteria such as pressure drop, heat transfer rates, and production costs. In an embodiment of the disclosure, EGR cooler 302 may also include using different number of channels types in a single EGR cooler.

In an embodiment, EGR cooler 302 may include at least one baffle plate 341 fixedly arranged in housing 307. The at least one baffle plate 341 may be in contact with at least a portion of the plurality of EGR channels 308. The at least one baffle plate 341 may support EGR channels 308 which are fixedly arranged in housing 307. Those skilled in the art will realize that additional and different configurations of baffle plates may be added to EGR cooler 302 to support the plurality of EGR channels 308.

In an aspect of the disclosure, exhaust gas is cooled by a coolant medium that circulates between channels and absorbs heat from the exhaust gas. The coolant medium enters EGR cooler 302 at coolant inlet 310 and circulates between the EGR channels 308 of EGR cooler 302 before being discharged at coolant outlet 314. The exhaust gas after flowing through EGR channels 308 exits the EGR cooler 302 at outlet 316 and proceeds to the intake manifold of a combustion engine.

In an embodiment, at least one surface of EGR channels 308 may be washcoated with a layer of a refractory solid, such as a high surface alumina. In an embodiment, the high surface alumina allows for sufficient heat transfer from the exhaust gas to the cooling media. In one or more arrangements, the high surface alumina may be added to at least a portion of the EGR cooler channel surfaces that contact the exhaust gas.

In an aspect of the disclosure, the high surface alumina may act as a support material for a PGM component or components added to the high surface alumina. The added PGM component may include platinum, palladium, and/or a combination of both platinum and palladium. This added catalytic component may burn any hydrocarbon present in the exhaust gas to prevent formation of a varnish on the internal surfaces of EGR cooler 302. The use of platinum and/or palladium as the catalytic material may enable catalytic efficiency to be maintained over a range of EGR cooler temperatures, and especially when lower temperature EGR flows returns after a period of high temperature flow. High temperature EGR flow typically occurs when an engine runs at high engine load.

FIG. 4 illustrates a cross sectional view of EGR cooler 302. As shown in FIG. 4, exhaust gases may flow within rectangular channels 420 as the coolant medium circulates between channels 422. The rectangular channels 420 may be washcoated to deposit a high surface alumina that may act as support material for a PGM component or components added to the high surface alumina. In an embodiment, FIG. 3B and FIG. 4, illustrate the addition of platinum to the high surface alumina mix at 331 and 440, respectively. In an embodiment, the washcoating may coat all surfaces of rectangular channels 420 in contact with exhaust gas. The addition of platinum may burn off any hydrocarbon present in the exhaust gas to prevent formation of varnish on the internal surfaces of the EGR cooler 302.

In another aspect of the disclosure, particular surfaces of the EGR channels 308 may be brazed or have a brazing material added to selective regions. In an embodiment, brazing may improve surface contact between the refractory solid while preventing the material from attaching to non-braised portions of the EGR coolers internal surfaces. This applied refractory solid may have added to it platinum, palladium, and/or a combination of both platinum and palladium. In an embodiment, selective incorporation of these dispersed platinum group metals may maintain high heat transfer and remove hydrocarbons that form varnish deposits.

In an aspect of the disclosure, EGR cooler 302 may include a plurality of channels fixedly arranged in the housing for receiving an exhaust gas. In an embodiment, the plurality of channels may include a first surface and a second surface opposite the first surface. The first surface of the plurality of channels may comprise brazed surfaces in contact with the exhaust gas.

In an embodiment, a coolant medium may circulate in the housing between coolant inlet 310 and coolant outlet 314. The coolant medium may be in contact with a second surface of the plurality of channels. EGR cooler 302 may also include a barrier layer. The barrier layer may coat the brazed surfaces of each of the plurality of channels to prevent soot and hydrocarbons from forming a varnish on the plurality of channels.

In yet another aspect of the disclosure, catalytic materials may be zoned coated so that the inlet of an EGR cooler has a higher PGM concentration. In an embodiment, a varying amount of catalytic material may be applied over different portions of an EGR cooler with same or generally same amount of coating materials but with higher concentration of catalytic materials. For example, a washcoat of a refractory oxide may be uniformly added to the surface of the EGR cooler but the PGM may have higher concentrations towards the inlet than outlet. For example, an inlet portion of EGR cooler may have on the order of 50 g/ft$^3$ Pt while the outlet portion may have only on the order of 5 g/ft$^3$. Alternatively, or in addition, the catalytic material may be applied only to the portion of the EGR cooler contiguous with the inlet of the EGR cooler where the exhaust gases are hottest or the like.

As shown in FIG. 5A, an EGR cooler 502 receives exhaust gas at inlet 506 of EGR cooler 502. The exhaust gas flows through a plurality of EGR channels 508 fixedly arranged in EGR cooler housing 507. In an embodiment, the EGR channels 508 may include different geometric configurations of channels such as straight, dimple, ribbon, spring, and spiral.

In an embodiment, EGR cooler 502 may include straight rectangular shaped EGR channels 508. As those skilled in the art will realize, EGR cooler 502 may use different channel geometric configurations based on various design criteria such as pressure drop, heat transfer rates, and production costs. In an embodiment of the disclosure, EGR cooler 502 may also include using different number of channels types in a single EGR cooler.

In an embodiment, FIG. 5 and FIG. 5B, illustrate zone coating in EGR cooler 502 where the inlet 506 of EGR cooler 502 has a higher PGM concentration. In an embodiment, more catalytic material may be applied over different portions of an EGR cooler with the same or generally the same amount of coating materials but with higher concentration of catalytic materials over different portions. As shown in FIG. 5A and FIG. 5B, a first zone 550 may represent an area adjacent the EGR cooler inlet 506. The first zone 550 may include a higher PGM concentration as first zone 550 is proximate the exhaust gas inlet. A second zone 560 may be adjacent first zone 550 but have a lower PGM concentration as the second zone 560 is adjacent EGR cooler outlet 516.

FIG. 6 illustrates a cross sectional view of EGR cooler 502. As shown in FIG. 6, exhaust gases may flow within rectangular channels 520 as the coolant medium circulates between channels 522. The rectangular channels 520 may be washcoated to deposit a high surface alumina that may act as a support material for a PGM component or components added to the high surface alumina.

In an embodiment, FIG. 5B and FIG. 6, illustrate the addition of platinum to the high surface alumina mix at 531 and 540, respectively. The addition of platinum may burn off any hydrocarbon present in the exhaust gas to prevent formation of varnish on the internal surfaces of the EGR cooler 302.

In another aspect of the disclosure, additional components of an EGR cooler may receive a barrier layer. For instance, different EGR coolers may include sensors, valves, and exhaust gas bypass components such as flappers or dampers. In an embodiment, a barrier layer may be applied to some or all of these additional components to prevent soot from adhering to parts of the EGR cooler. In addition, in some embodiments, a barrier coating may extend to components adjacent the EGR cooler such as intake and exhaust manifolds. In an embodiment, the barrier coatings may only extend into portions of the adjacent components.

In an aspect of the disclosure, a barrier layer may include multiple layers applied on top of each other. For instance, a barrier layer may comprise a brazed layer, a highly porous material layer, a refractory solid layer, and a catalytic layer. Those skilled in the art will realize that different combinations of layers and amounts deposited for each layer have been envisioned in accordance with various embodiments of the disclosure.

For instance, in some arrangements, particular surfaces of EGR channels 308 may be brazed. The brazing may be included as the first layer of a multilayer barrier layer. In an embodiment, brazing may improve surface contact between a refractory solid while preventing the material from attaching to non-braised portions of the EGR coolers internal surfaces.

In an embodiment, a second layer of the multilayer barrier layer may include a highly porous material added on top of the internal brazed surfaces of EGR cooler. The highly porous material may allow hot exhaust gases to penetrate to the surface for heat transfer but prevent soot and hydrocarbons from touching the cold surfaces of the EGR cooler and forming a varnish that lowers heat transfer efficiency.

In an embodiment, a third layer of the multilayer barrier layer may include a refractory solid such a high surface alumina that is applied on top of the highly porous material. The refractory solid may include a high surface alumina. The high surface alumina may allow for sufficient heat transfer from the exhaust gas to the cooling media.

In an embodiment, a fourth layer of the multilayer barrier layer may include a catalytic layer. The catalytic layer may include a PGM (platinum group metal) component or components added to the high surface alumina. This added catalytic component may burn any hydrocarbon present in the exhaust gas and prevent formation of a varnish on the internal surfaces of EGR cooler 302.

In an aspect of the disclosure, the catalytic layer may include a mixed metal oxide known for hydrocarbon oxidation activity such as those having polyvalent transition metals such as Mo (molybdenum), Co (cobalt) and/or Mn (manganese). The mixed metal oxide may include perovskites of the general formula of $ABO_3$ and contain La, Co, Ba, Sr, Mn, and Y among other suitable elements.

In another aspect of the disclosure, numerous different washcoats may be applied to an EGR cooler in accordance with various embodiment of the disclosure. For instance, different washcoats may be applied to the inlet of the EGR cooler as compared the outlet of the EGR cooler. The different washcoats may represent different zones that have different types or amounts of coating to be applied.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. An exhaust gas recirculation (EGR) cooler comprising:
   a housing extending between an inlet and an outlet;
   a plurality of channels fixedly arranged in the housing for receiving an exhaust gas from the inlet, the plurality of channels having a first surface and a second surface opposite the first surface, the first surface of the plurality of channels having a multilayer barrier layer in contact with the exhaust gas, the second surface of the plurality of channels configured to be in contact with a cooling medium; wherein
   the multilayer barrier layer comprises a porous material coating the first surfaces of each of the plurality of channels that allows exhaust gases to penetrate through the first surface for heat transfer while adhering to soot and hydrocarbons to prevent the soot and hydrocarbons from forming a varnish on the plurality of channels.

2. The EGR cooler of claim 1 further comprising:
   at least one baffle plate fixedly arranged in the housing, the baffle plate in contact with at least a portion of the plurality of channels;
   a coolant inlet;
   a coolant outlet;
   wherein the cooling medium in the housing circulates between the coolant inlet and the coolant outlet, the cooling medium in contact with the second surface of the plurality of channels to effect heat transfer from the exhaust gas to the cooling medium.

3. The EGR cooler of claim 1 wherein the the first surface of each of the plurality of channels additionally comprises a refractory solid oxide.

4. The EGR cooler of claim 1 wherein the multilayer barrier layer comprises a refractory solid oxide and a catalytic material to burn soot and hydrocarbons and prevent varnish formation.

5. The EGR cooler of claim 4 wherein the catalytic material comprises a platinum group metal.

6. The EGR cooler of claim 5 wherein platinum group metal comprises a combination of platinum and palladium.

7. The EGR cooler of claim 5 wherein the catalytic material comprises a mixed metal oxide.

8. The EGR cooler of claim 7 wherein the mixed metal oxide comprises a polyvalent transition metal.

9. An exhaust gas recirculation (EGR) cooler comprising:
   a housing extending between an inlet and an outlet;
   a plurality of channels fixedly arranged in the housing for receiving an exhaust gas; and
   a multilayer barrier layer comprising a refractory solid oxide and catalytic material coating at least a first zone of the plurality of channels, wherein the first zone coated with the multilayer barrier layer is configured to be in contact with the exhaust gas at the inlet of the EGR cooler without spanning an entirety of the plurality of channels to prevent soot and hydrocarbons from permanently forming on the plurality of channels; and
   wherein the first zone has a higher concentration of catalytic material as compared to any other zone of the EGR cooler.

10. The EGR cooler of claim 9 wherein a second zone is adjacent to the outlet of the EGR cooler and has a multilayer barrier layer with a lower concentration of catalytic material as compared to the first zone.

11. The EGR cooler of claim 9 wherein the refractory solid oxide is a high surface alumina.

12. The EGR cooler of claim 9 wherein the catalytic material comprises a platinum group metal.

13. The EGR cooler of claim 12 wherein the platinum group metal comprises a combination of platinum and palladium.

14. The EGR cooler of claim 9 wherein the barrier layer comprises a refractory solid oxide and a mixed metal oxide to prevent varnish formation.

15. The EGR cooler of claim 14 wherein the mixed metal oxide comprises a polyvalent transition metal.

* * * * *